T. C. HARRIS
Mode and Mechanism for Testing the Balance of Wheels and Pulleys.
No. 209,475.  Patented Oct. 29, 1878.
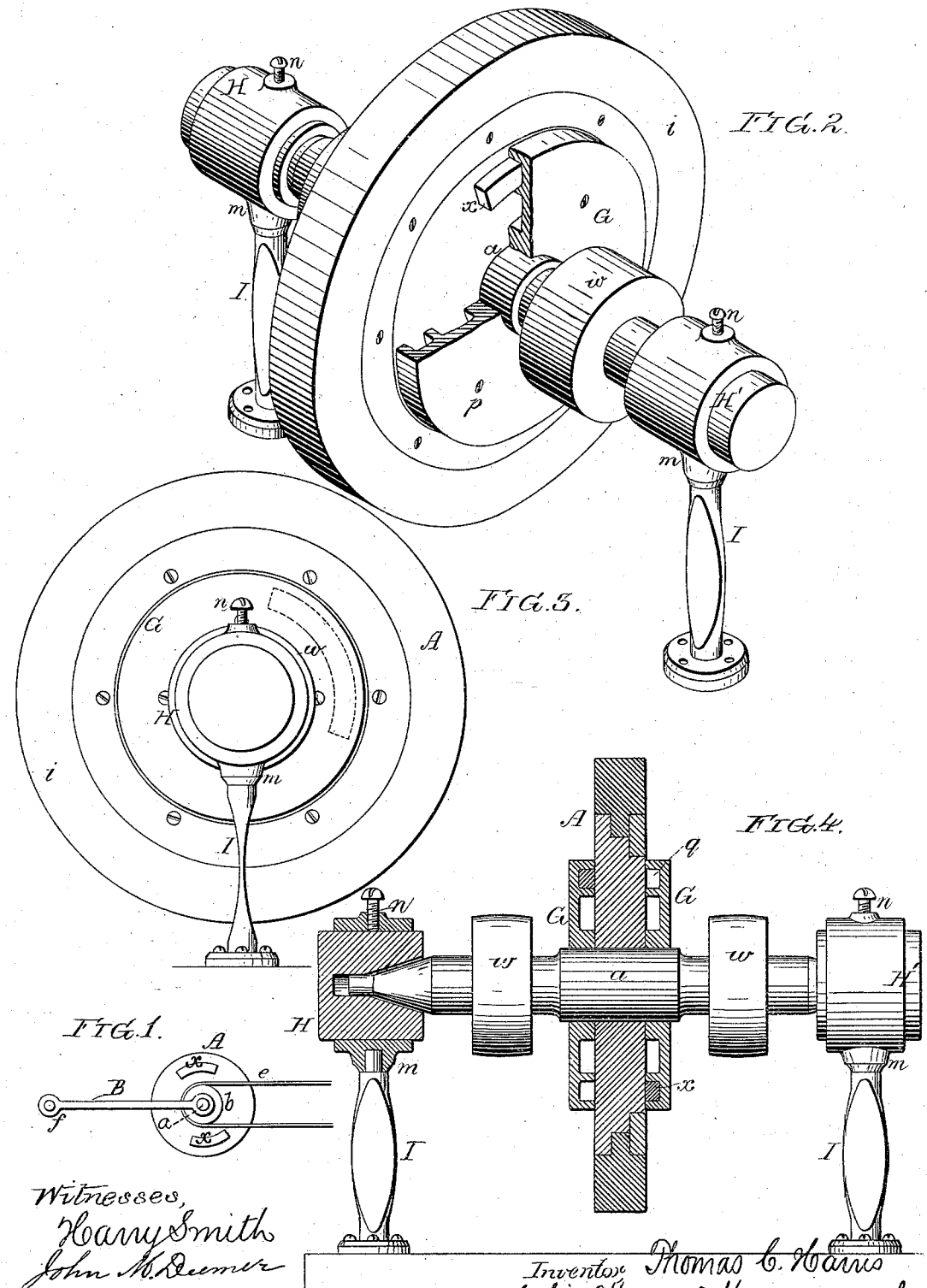

UNITED STATES PATENT OFFICE.

THOMAS C. HARRIS, OF WILMINGTON, DELAWARE.

IMPROVEMENT IN MODE AND MECHANISM FOR TESTING THE BALANCE OF WHEELS AND PULLEYS.

Specification forming part of Letters Patent No. 209,475, dated October 29, 1878; application filed May 20, 1878.

*To all whom it may concern:*

Be it known that I, THOMAS C. HARRIS, of Wilmington, Delaware, have invented a new and useful Mode of and Mechanism for Testing the Balance of Wheels and Pulleys, of which the following is a specification:

The object of my invention is to facilitate the balancing of wheels or pulleys carried by shafts or spindles; and this object I attain in the manner which I will now proceed to describe.

There are many wheels the perfect balancing of which is of great importance, and among these are emery or corundum wheels, which have to revolve at great speed, a slight preponderance in a wheel of this class at any point resulting in such a jarring that its periphery cannot move in an exactly true circle, the journals and bearings being at the same time injuriously affected by the jarring, the vehemence of which is increased as the speed of the wheel increases.

A preliminary understanding of my invention may be best acquired by reference to and an explanation of the diagram Figure 1 in the accompanying drawing, in which the wheel A to be tested is secured to a shaft, $a$, having a pulley, $b$, for receiving a belt, $e$, from any driving-pulley.

The shaft has its bearings in a link or links, B, which are hinged to a fixed pin, $f$, so that the shaft, with its pulley, is supported solely by this pin and by the belt $e$.

If the wheel is perfectly balanced and is caused to revolve rapidly it will remain in the same vertical position; but if it is out of balance the wheel will vibrate in the arc of a circle of which the fixed pin $f$ is the center.

If the wheel be furnished with movable segments $x$ the latter may be adjusted until all vibrations cease; and this will be a certain indication that the wheel has been perfectly balanced by the said segments.

In applying my invention to the balancing of emery or corundum wheels, such as are used for finishing of chilled rolls, I prefer to adopt the mechanism illustrated in Figs. 2, 3, and 4 of the accompanying drawing, Fig. 2 being a perspective view, partly in section; Fig. 3, an end view, and Fig. 4 a side elevation, partly in section.

The wheel A consists of a metal disk, $h$, secured to the shaft $a$, and a rim, $i$, of corundum or emery composition, suitably confined to the periphery of the disk. H H are the opposite bearing-blocks of the shaft, the journals of which are, in the present instance, partly conical and adapted to similarly-shaped recesses in the said blocks, which are so fitted into openings in the heads $m$ of the two pillars I I that they can be adjusted therein and secured after adjustment by the screws $n$. The stems of these pillars, preferably of steel, are made thin, so as to possess more or less elasticity.

A circular plate, G, is secured to each side of the disk $h$ by set-screws $p$, and in the inside of each plate, and concentric therewith, is an annular recess, $q$, containing one or more metal segments, $x$, which can be moved to any desired position within the said recess, the depth of the latter being somewhat less than the thickness of the segment, so that when the plate is screwed tight the segment will be firmly confined between the plate and the disk of the wheel.

The driving-belts for the pulleys $w\ w$ on the shaft $a$ should pass from a driving-pulley above or below the machine, so that the pull on the shaft should be upward or downward, (preferably upward,) and not lateral.

When the shaft is rapidly revolved and the wheel is out of balance there will be a rapid vibration of the elastic pillars, which suggests the necessity of an adjustment of the segments; and this is effected, after the movement of the wheel has been arrested, by loosening one or other or both of the plates G until a suitable instrument can be introduced between the plate and the disk for adjusting the segment to any extent which the vibration of the pillars may suggest to the attendant who has charge of the machine.

When the plate and segments have been again secured by the set-screws $p$, and the shaft is again revolved, the vibration of the wheel, due to the elastic pillars, will determine, by the diminution or increase in the intensity of the vibration, whether the first adjustment of the segments has been in the right direction, and will suggest a proper second adjustment; and the adjustments may be continued until all vibration of the wheel ceases and the pillars are in a quiescent condition while the wheel revolves, and this will determine the fact that the wheel is in a properly-balanced condition for use.

The importance of a truly-balanced corundum or emery wheel will be understood when it is remembered that wheels of this class are sometimes driven at the rate of three thousand revolutions per minute.

It is not necessary in balancing these wheels that in all cases there should be a plate with adjustable balancing-segments on both sides of the wheel, although I prefer the arrangement described.

The application of my invention is not restricted to corundum or emery wheels, for it may be used to advantage in connection with any wheels or pulleys which have to revolve at a high rate of speed, and the jarring of which has a detrimental effect on the machinery with which they are connected and on the building in which the machinery is located.

In the case of emery or corundum wheels, the adjustable counterbalancing-weights are necessary on one or both sides; but in pulleys they may be placed on the inside of the rim, and in fly-wheels on the rim or on the arms. Indeed, the character, location, and mode of securing the counterbalance-weights will, in a great measure, depend upon that of the wheel or pulley.

I claim as my invention—

1. The mode herein described of determining whether wheels or pulleys on shafts or spindles are properly balanced—that is to say, causing the said wheel or pulley to revolve in bearings which are at liberty to vibrate, as herein set forth.

2. A wheel-testing machine in which two bearings for the shaft carrying the wheel to be tested are combined with and supported by elastic pillars, substantially as set forth.

3. The combination of a wheel, A, with a plate, G, secured to one or both sides of the said wheel, and having a recess for receiving one or more adjustable counterbalancing-segments, substantially as set forth.

In testimony whereof I have signed my name to this specification in the presence of two subscribing witnesses.

THOMAS C. HARRIS.

Witnesses:
    EDWD. I. P. GRUBB,
    GEO. G. LOBDELL, Jr.